May 13, 1947.  S. J. SMITH  2,420,501

ELECTRIC FOLLOW-UP SYSTEM

Filed Oct. 13, 1943

INVENTOR
STANLEY JAMES SMITH
By
Watson, Cole, Grindle + Watson

Patented May 13, 1947

2,420,501

UNITED STATES PATENT OFFICE 2,420,501

ELECTRIC FOLLOW-UP SYSTEM

Stanley James Smith, London, England, assignor to Simmonds Aerocessories Limited, London, England Application October 13, 1943, Serial No. 506,107
In Great Britain October 20, 1942

1 Claim. (Cl. 172—239)

This invention relates to electric remote control systems of the kind in which the receiver comprises an electric motor controlling the position of a slider on a potential divider and the transmitter comprises a second potential divider of which the slider is controlled by the motion to be transmitted, the two potential dividers being connected in parallel with a source of E. M. F. and the two sliders being connected with a field winding of a dynamo, the arrangement being such that if the two sliders are out of alignment the resulting potential difference therebetween causes a current to flow through the field winding and thus energise the dynamo the output of which is connected with the motor of the receiver such that this motor rotates to move the slider of the potential divider at the receiver into alignment with that at the transmitter.

In such an arrangement the output of the dynamo, which of course during operation of the system is rotated by any suitable means, is proportional to the degree of misalignment of the sliders, consequently when the two sliders are close to alignment the output of the dynamo may be insufficient to cause the motor to rotate. The re-setting accuracy of such a system is accordingly low and in many cases this renders the arrangement unsuitable.

An object of the present invention is to provide a simple remote control system in which the re-setting accuracy is high.

A further object of the invention is to provide a remote control system of the kind described in which even a small displacement of the controlling slider causes full dynamo output to be obtained.

Other objects and advantages of the present invention will become apparent during the course of the following description of the accompanying drawings in which—

Figure 1:
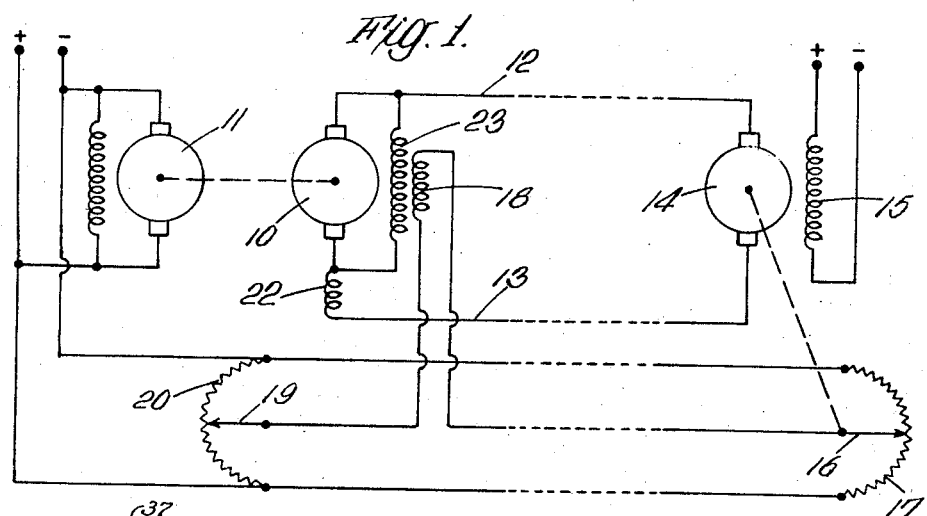
Figure 3:
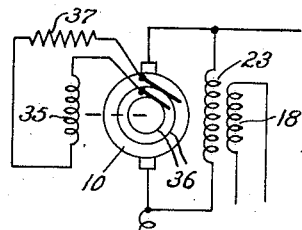
Figure 2:
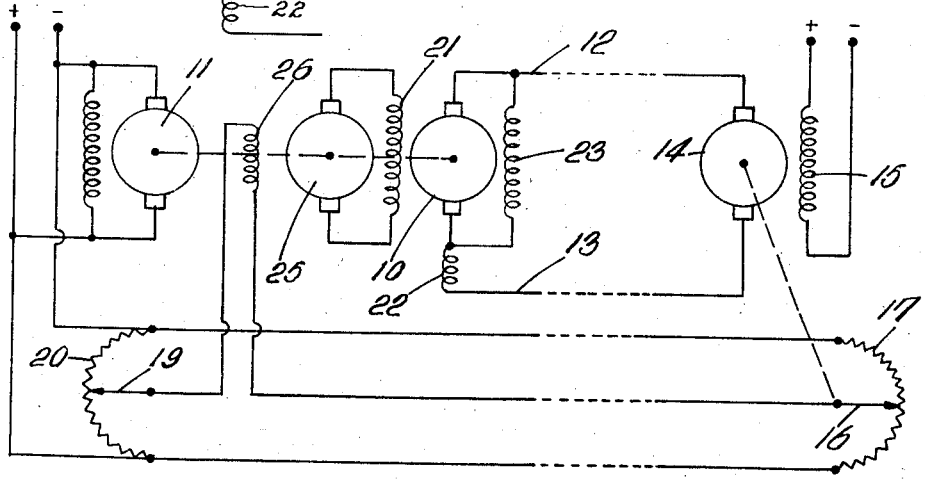

Fig. 1 shows a wiring diagram of a remote control system in accordance with the invention, Fig. 2 shows a wiring diagram of an alternative form of remote control system, and Figure 3 is a wiring diagram of a further modification of Figure 1.

Referring now to Fig. 1, the remote control system therein shown comprises a dynamo 10 which is coupled to driving motor 11, and a remote driven motor 14. The output of dynamo 10 is fed through conductors 12 and 13 to motor 14 which may be coupled with apparatus to be controlled and the field winding 15 of this motor is connected to any suitable direct current source. The motor 14 is also coupled through suitable gearing with the slider 16 of potential divider 17. Slider 16 is connected electrically with one end of a field winding 18 of dynamo 10 and the other end of this winding is connected with a slider 19 of a potential divider 20. The two potential dividers 17 and 20 are connected in parallel and with a suitable direct current source with which is also connected the driving motor 11. Thus far the system described is well known and in operation if the sliders are in alignment there will be no potential difference between them and consequently no current will flow in field winding 18. If then slider 19 is moved manually, or by the motion which it is desired to transmit to the remote point, the resulting potential difference between the sliders 19 and 16 will cause a current to flow through the field winding 18 so as to energise the dynamo and produce an output which is fed to motor 14 and is of such sense that this motor rotates and drives the slider 16 in the same direction as that taken by slider 19. When slider 16 reaches that position where it is in alignment with slider 19 and there is no difference in potential between them the exciting current to dynamo 10 ceases and the output thereof falls to zero. Owing to frictional losses in motor 14 this motor may cease to rotate while there is still a difference in potential between the sliders 19 and 17. Or similarly it may not start to rotate when the movement of slider 19 from a position of zero potential difference is less than a certain amount since in both cases the dynamo output, which is approximately proportional to the current flowing in the exciting winding 18 for small values of this current, may not be sufficient to overcome the losses of motor 14.

In accordance with the invention these defects are overcome by the provision of two extra field windings on the dynamo 10. As shown in Fig. 1 these windings are a series winding 22 and a shunt winding 23. In the absence of any excitation due to field winding 18 these extra field windings 22 and 23 are insufficient to make the dynamo self-exciting. It may here be pointed out that the residual magnetism in the field of dynamo 10 must be arranged to be as small as possible otherwise difficulties may be experienced when the direction of movement of the system is reversed. The use of a suitable grade of iron or steel laminations for the field core is therefore important. Considering the operation of the complete system of Fig. 1 when the dynamo 10 is excited by current flowing in winding 18 the current flowing in conductors 12 and 13 will be high momentarily since the motor 14 until it begins to rotate presents a very low resistance. Accordingly this current which also flows in the series field winding 22 greatly assists to reinforce the excitation in the field of dynamo 10 thus still further increasing the dynamo output. The dynamo output accordingly increases very rapidly so soon as any current flows in field winding 18 and is maintained at a high value even when motor 14 begins to rotate since although the back E. M. F. built up tends to reduce the current flowing in conductors 12 and 13 the consequent rise in potential across the terminals of shunt field winding 23 causes more current to flow through this winding to maintain the excitation. In this manner when a current flows in field winding 18 due to movement of slider 19 the output of dynamo 10 builds up very rapidly to a maximum which is substantially independent of the magnitude of this current. The motor 14 rotates to move slider 16 in a direction which reduces the current in field winding 18 and so soon as this current falls to zero the output of dynamo collapses the field windings 22 and 23 being as stated insufficient to maintain excitation and the constant field excitation of motor 14 which may be large retards the rotation of motor 14 very rapidly.

Referring now to Fig. 2 there is shown a wiring diagram of a modified system which may conveniently be used where a large power output is required. As mentioned previously the residual magnetism in the field of dynamo 10 may cause difficulties when the direction of movement of the system is to be reversed for as will readily be understood a small reverse movement of slider 19 may not enable sufficient current to flow through field winding 18 to overcome this residual field. Where the dynamo 10 is required to give a large output the design of a suitable field core may be difficult and accordingly in the form of the invention shown in Fig. 2 a separate exciter 25 is provided. The field winding 26 of the exciter is connected with sliders 16 and 19 and the output is applied to field winding 27 of the dynamo 10. The exciter 25 which is only required to provide a relatively low output may be designed to have a substantially zero residual field and the gain of the system considered as the ratio of the power output of dynamo 10 to the power input to field winding 26 is of course considerably increased.

A further method of reducing the effects of residual magnetism consists in providing slip rings on the dynamo 10 so connected with the armature windings that a small alternating current is provided which may be fed to an additional field winding. The additional field windings 22 and 23 of dynamo 10 described in connection with Fig. 1 may also be provided in this modification of the invention.

This modified arrangement is illustrated in Figure 3 of the drawings as applied to the system shown in Figure 1, the dynamo 10 being shown as provided with a further field winding 35 which is supplied with alternating current from slip rings 36 on the dynamo shaft, the current flow being limited, if necessary, by resistance 37 in series with the winding.

In both forms of the invention the operation, which resembles that of a self-balancing bridge, is extremely sensitive and the resetting accuracy may be made very high without the system becoming unstable.

I claim:

A remote control system having a transmitter comprising a potential divider and a slider thereon the movement of which slider is to be repeated at a remote point, a receiver comprising a second potential divider, a second slider thereon and a motor operatively connected with the said second slider, a source of energy for the said motor comprising a dynamo, the armature of which is electrically connected with the armature of the said motor, means establishing a field for said dynamo, said means including a dynamo field winding and including connections with said sliders whereby said means is energized when said sliders are relatively displaced to provide a potential difference therebetween, a second dynamo field winding connected in series with the output of the dynamo of such size as to be insufficient to initiate or maintain excitation of the dynamo in the absence of current in the said first field winding, means for connecting the two potential dividers in parallel and with a source of direct current, a third dynamo field winding connected in parallel with the dynamo armature and of such size as to be insufficient to initiate or maintain excitation in the absence of current in the said first field winding, and means supplying said dynamo with an alternating current field.

STANLEY JAMES SMITH.

REFERENCES CITED

The following references are of record in the file of this patent:

UNITED STATES PATENTS

| Number | Name | Date |
| --- | --- | --- |
| 1,901,685 | Whiting | Mar. 14, 1933 |
| 2,311,462 | Neal | Feb. 16, 1943 |
| 2,351,316 | Borden | June 13, 1944 |
| 2,356,152 | Edwards et al. | Aug. 22, 1944 |
| 516,804 | Fiske | Mar. 21, 1894 |
| 559,904 | Pfatischer | May 12, 1896 |
| 1,800,328 | Sundhaussen | Apr. 14, 1931 |
| 1,932,073 | James | Oct. 24, 1933 |
| 2,168,032 | Japolsky | Aug. 1, 1939 |
| 2,317,258 | Dilworth | Apr. 20, 1943 |